United States Patent
Masaoka et al.

(10) Patent No.: US 12,265,218 B2
(45) Date of Patent: Apr. 1, 2025

(54) HEAD-UP DISPLAY DEVICE AND LIGHT-TRANSMISSIVE MEMBER USED THEREFOR

(71) Applicant: TEIJIN LIMITED, Osaka (JP)

(72) Inventors: Koichi Masaoka, Osaka (JP); Kyoichi Kubo, Osaka (JP)

(73) Assignee: TEIJIN LIMITED, Osaka (JP)

( * ) Notice: Subject to any disclaimer, the term of this patent is extended or adjusted under 35 U.S.C. 154(b) by 529 days.

(21) Appl. No.: 16/635,651

(22) PCT Filed: Jul. 25, 2018

(86) PCT No.: PCT/JP2018/027809
§ 371 (c)(1),
(2) Date: Jan. 31, 2020

(87) PCT Pub. No.: WO2019/031238
PCT Pub. Date: Feb. 14, 2019

(65) Prior Publication Data
US 2021/0124169 A1    Apr. 29, 2021

(30) Foreign Application Priority Data

Aug. 9, 2017 (JP) .................................. 2017-154330
Feb. 22, 2018 (JP) .................................. 2018-029798

(51) Int. Cl.
*G02B 27/01* (2006.01)
*C08K 3/22* (2006.01)
(Continued)

(52) U.S. Cl.
CPC ............ *G02B 27/0101* (2013.01); *C08K 3/22* (2013.01); *G02B 5/208* (2013.01); *G02B 5/3083* (2013.01); *C08K 2003/2258* (2013.01)

(58) Field of Classification Search
CPC .... G02B 27/0101; G02B 27/01; G02B 5/208; G02B 5/3083; G02B 5/20; G02B 5/206;
(Continued)

(56) References Cited

U.S. PATENT DOCUMENTS

2008/0239212 A1* 10/2008 Nakamura ........ G02F 1/133632
                                                                    349/96
2010/0219654 A1*  9/2010 Fujita ................ B32B 17/10761
                                                                    296/97.7

(Continued)

FOREIGN PATENT DOCUMENTS

EP    2 818 519    12/2014
EP    2 883 847     6/2015
(Continued)

OTHER PUBLICATIONS

Yamamoto et al., JP 2017032944, English language machine translation, original patent published Feb. 9, 2017, translation generated Jul. 26, 2022 (Year: 2017).*

(Continued)

*Primary Examiner* — Stephone B Allen
*Assistant Examiner* — Adam W Booher
(74) *Attorney, Agent, or Firm* — Wenderoth, Lind & Ponack, L.L.P.

(57) ABSTRACT

An object of the present invention is to provide a light-transmissive cover, which does not deteriorate luminance of images projected from a display unit, while easily suppressing heat input from the sun into the display unit of a head-up display without using an expensive member. The present invention is a light-transmissive member for use in a head-up display device, and the light-transmissive member is formed of a polycarbonate-based resin composition, has a thickness in a range of 0.2 to 0.6 mm and contains composite tungsten oxide particles as an infrared ray shielding agent, (Continued)

wherein a content of the composite tungsten oxide particles, A (weight %), and a thickness of a layer containing the composite tungsten oxide particles, B (mm), satisfy the following formula (1):

$$0.02 \leq A \times B \leq 0.12. \quad (1)$$

4 Claims, 1 Drawing Sheet

(51) Int. Cl.
*G02B 5/20* (2006.01)
*G02B 5/30* (2006.01)

(58) Field of Classification Search
CPC .......... G02B 5/22; G02B 5/30; G02B 5/3025; C08K 3/22; C08K 2003/2258; B60K 35/00
See application file for complete search history.

(56) References Cited

U.S. PATENT DOCUMENTS

| | | | | |
|---|---|---|---|---|
| 2015/0024211 | A1* | 1/2015 | Miratsu | C08K 3/24 252/62 |
| 2017/0010390 | A1* | 1/2017 | Nakahara | C08L 33/12 |
| 2017/0320297 | A1* | 11/2017 | Bennison | B32B 17/10633 |
| 2019/0040251 | A1* | 2/2019 | Kobayashi | C08K 3/22 |
| 2019/0041638 | A1* | 2/2019 | Ono | G02B 5/281 |

FOREIGN PATENT DOCUMENTS

| | | |
|---|---|---|
| JP | 61-184132 | 8/1986 |
| JP | 2006-154516 | 6/2006 |
| JP | 2015-31753 | 2/2015 |
| JP | 2016-130066 | 7/2016 |
| JP | 2016-157068 | 9/2016 |
| JP | 2017-32944 | 2/2017 |
| JP | 2017-116882 | 6/2017 |
| JP | 2017-125882 | 7/2017 |

OTHER PUBLICATIONS

Tsuburaya Manabu, JP 2016157068, English language machine translation, original patent published Sep. 1, 2016, translation generated Jul. 26, 2022 (Year: 2016).*
Office Action issued Jan. 5, 2021 in corresponding Japanese Patent Application No. 2019-535087 with English-language translation.
International Search Report issued Oct. 23, 2018 in International (PCT) Application No. PCT/JP2018/027809.
European Search Report issued Sep. 25, 2020 in corresponding European Patent Application No. 18845006.8.

* cited by examiner

[Fig. 1]
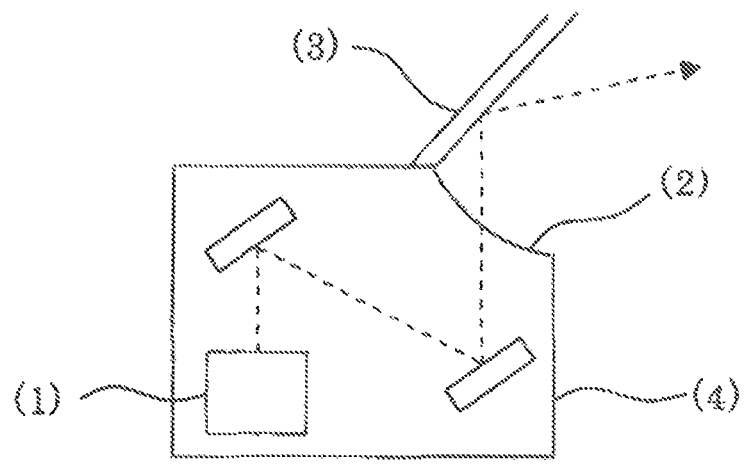
[Fig. 2]
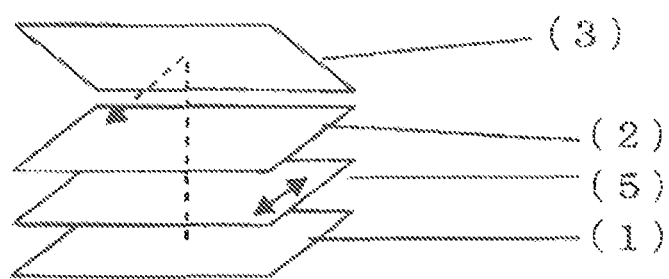

HEAD-UP DISPLAY DEVICE AND LIGHT-TRANSMISSIVE MEMBER USED THEREFOR

TECHNICAL FIELD

The present invention relates to a head-up display device and a light-transmissive member used therefor.

BACKGROUND ART

A head-up display device makes images displayed via a display unit such as a displayer or the like and makes the images projected on glass or the like which is within user's sight. Hereat, unlike a display device used indoor, external light (sunlight) reversely enters the display unit and damages the same because heat rays (infrared rays) in the external light increase the temperature thereof.

Therefore, in order to prevent penetration of the heat rays, PLT 1 proposes providing a reflection portion in a light passage which extends from a display element to windshield glass, wherein a cold mirror is provided on the reflection portion and the cold mirror is coated with an optical interference film which transmits infrared rays but reflects visible light, or providing an infrared reflection plate in the light passage which reflects infrared rays but transmits visible light.

Therefore, in recent years, a polarizer has been arranged in the light passage in order to further prevent penetration of heat rays without impairing luminance of the display unit. In such circumstances, PLT 2 proposes providing polarization characteristic to a light-transmissive cover for preventing dust and dirt from entering through a projection port, through which images are projected from a device body onto a projection part such as glass and the like.

In addition, PLT 2 proposes a structure in which a plurality of polarizers are laminated because, when a common polarizer is stuck to a polycarbonate plate in order to provide the cover with polarization characteristics, there is a fear that bending may occur to the polycarbonate plate due to heat, causing projected images to be distorted and the cover to curl and be disconnected from the housing.

CITATION LIST

Patent Literature

[PLT 1] Japanese Unexamined Patent Application Publication No. S61-184132
[PLT 2] Japanese Unexamined Patent Application Publication No. 2017-32944

SUMMARY OF INVENTION

Technical Problem

For the head-up display device, it is an important problem to shield heat rays in external light, and various measures are taken for that purpose, such as a cold mirror and polarizer. However, because the cold mirror, polarizer, and the like are manufactured via very complex processes, they become very expensive as components.

Thus, a first object of the present invention is to provide a light-transmissive member, especially a light-transmissive cover, which does not deteriorate luminance of images projected from a display unit, while easily suppressing heat input from the sun into the display unit of a head-up display without using such an expensive member.

Further, a second object of the present invention is to provide a light-transmissive member, especially a light-transmissive cover, which can satisfy, in addition to the above object, not only visibility by naked eyes but also visibility through polarized sunglasses.

Furthermore, a third object of the present invention is to provide a light-transmissive member which, with regard to increase in heat input due to an increase in the size of a head-up display in recent years, suppresses further heat input and does not deteriorate luminance of images projected from a display unit.

Solution to Problem

In order to achieve the above objects, the present inventors conducted diligent research to impart a light shielding effect in the infrared region to a light-transmissive member itself that is used for a head-up display device. As a result, the inventors found that an effect equivalent to that of a polarizer could be obtained by a specific light-transmissive member, and reached the present invention.

Further, the inventors found that satisfaction of both visibility by naked eyes and visibility through polarized sunglasses, the second object, can be achieved by setting an in-plane retardation in a specific range, and reached the present invention.

That is, the present invention provides the following light-transmissive members of (1) to (7) and a head-up display device of (8) using the same:

(1) A light-transmissive member for use in a head-up display device, the light-transmissive member formed of a polycarbonate-based resin composition, wherein the light-transmissive member has a thickness in a range of 0.2 to 0.6 mm and contains composite tungsten oxide particles as an infrared ray shielding agent, wherein the content of the composite tungsten oxide particles, A (weight %), and a thickness of a layer containing the composite tungsten oxide particles, B (mm), satisfy the following formula:

$$0.02 \leq A \times B \leq 0.12. \tag{1}$$

(2) The light-transmissive member according to clause (1), wherein the composite tungsten oxide particles are those represented by a general formula of $M_xW_yO_z$ (where M is one or more element(s) selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I; W is tungsten; O is oxygen; and $0.1 \leq x \leq 0.5$, $0.5 \leq y \leq 1.5$, and $2.0 \leq z \leq 3.5$).

(3) The light-transmissive member according to clause (1), wherein an average light transmittance in a wavelength range of 380 to 780 nm is 70% or more, and an average light transmittance in a wavelength range of 700 nm to 2500 nm is 50% or less.

(4) The light-transmissive member according to clauses (1) to (3), wherein an in-plane retardation is in a range of 20 to 170 nm.

(5) The light-transmissive member according to clauses (1) to (3), wherein an in-plane retardation is in a range of 100 nm or less.

(6) The light-transmissive member according to clauses (1) to (5), wherein the light-transmissive member is used as a light-transmissive cover of a head-up display device.

(7) The light-transmissive member according to clause (6), further provided with a polarization function.

(8) A head-up display device comprising: the light-transmissive member according to clauses (1) to (7); and a display unit that outputs images outside through the light-transmissive member.

Advantageous Effects of Invention

Because the light-transmissive member itself has light-transmissivity and high heat ray shielding performance against heat input from the sun into the display unit of a head-up display that are equivalent to those of a polarizer, the temperature increase of the head-up display device can be suppressed more easily. Further, because the in-plane retardation is set in a specific range, both visibility by naked eyes and visibility through polarized sunglasses can be satisfied. Furthermore, being different from the conventional means for shielding heat rays such as a polarizer, cold mirror, and the like, the light-transmissive member can also be used as a further means for shielding heat rays to correspond to an increase in the size of the head-up display device by using it together with the polarizer, cold mirror, and the like.

BRIEF DESCRIPTION OF DRAWINGS

FIG. 1 is a structural example of a head-up display.
FIG. 2 is a summary of a method for evaluating luminance of a test piece.

DESCRIPTION OF EMBODIMENTS

A head-up display generally comprises, as shown in FIG. 1, a display unit (1) and a light-transmissive member (2), and output images are projected on a projection surface (3). Here, in order for display abnormality due to dust and dirt to be suppressed and, further, in order to reduce an influence of heat rays, it is a preferable embodiment to arrange a display unit of the head-up display in a space partitioned by a housing (4) and a light-transmissive member, and to arrange therein a polarizer, mirrors (reflection plate, cold mirror, etc.), and the like.

The display unit (1) is, in the head-up display device, a device that outputs images to be projected. As the display unit (1), there may be employed one that is publicly known per se, and preferable is a liquid crystal display (LCD) because it can project images having excellent visibility by using polarized light under a circumstance where external light is present. A light source used for the display unit is not particularly limited but is preferably one that radiates only a small amount of hot rays. From such a viewpoint, the light source may be preferably exemplified by an organic EL device and an LED.

The light-transmissive member of the present invention is arranged between the display unit (1) and the light-transmissive cover (2), is preferably mounted on the housing (4), and is especially preferably used as the light-transmissive cover which prevents dust and dirt from entering through a projection port.

Hereinafter, the light-transmissive member of the present invention will be described in detail.

The light-transmissive member of the present invention is a light-transmissive member formed of a polycarbonate-based resin composition, wherein the light-transmissive member contains composite tungsten oxide particles as an infrared ray shielding agent and has a thickness of 0.2 to 0.6 mm, wherein a content of the composite tungsten oxide particles, A (weight %), and a thickness of a layer containing the composite tungsten oxide particles, B (mm), satisfy the following formula:

$$0.02 \leq A \times B \leq 0.12.$$

The present inventors found that, in a light-transmissive member, both luminance and shielding of heat rays that are equivalent to those of a polarizer can be satisfied by making such a thin member contain a specific concentration of the composite tungsten oxide particles.

The product of the content (A) of the composite tungsten oxide particles and the thickness (B) of the light-transmissive member being in the above range enables the light-transmissive member to be highly provided with luminance and heat ray shielding. The value of $A \times B$ preferably satisfies $0.03 \leq A \times B \leq 0.09$, and more preferably $0.05 \leq A \times B \leq 0.07$. When the value of $A \times B$ is less than the lower limit, a heat ray shieling effect becomes small and, when the value of $A \times B$ exceeds the upper limit, deterioration of luminance becomes large. In addition, the thickness of the light-transmissive member is in a range of preferably 0.3 mm to 0.55 mm, and more preferably 0.35 to 0.5 mm. When the thickness of the light-transmissive member exceeds the upper limit, haze thereof tends to become high. On the other hand, when the thickness is less than the lower limit, the content of the composite tungsten oxide particles becomes relatively increased, and poor dispersion thereof tends to occur.

A polycarbonate resin in the present invention can be produced, for example, by reacting a dihydric phenol and a carbonate precursor. Here, the dihydric phenol used is not particularly limited but, from the viewpoint of transparency and the like, is a bis(4-hydroxypnenyl)alkane. Above all, from the viewpoint of shock resistance, especially preferable is bisphenol A.

As the carbonate precursor, there is used a carbonyl halide, a carbonic acid diester, a halo-formate, or the like. Specifically, there may be mentioned phosgene, a diphenyl carbonate, a dihalo-formate of a dihydric phenol, or the like.

When producing a polycarbonate resin from the dihydric phenol and the carbonate precursor by an interfacial polymerization method, there may be used as necessary a catalyst which is per se publicly known, a terminal stopping agent, an antioxidant for preventing the dihydric phenol from oxidation, and the like. Further, the polycarbonate resin of the present invention includes a branched polycarbonate resin obtained by copolymerizing a trifunctional or more polyfunctional aromatic compound, a polyester carbonate resin obtained by copolymerizing an aromatic or aliphatic (including alicyclic) bifunctional carboxylic acid, a copolymer polycarbonate resin obtained by copolymerizing a bifunctional alcohol (including alicyclic), and a polyester carbonate resin obtained by copolymerizing such a bifunctional carboxylic acid and bifunctional alcohol at the same time.

The light-transmissive member of the present invention is, as mentioned above, formed of a polycarbonate-based resin composition, wherein the resin composition comprises a polycarbonate resin and an infrared ray shielding agent and further, if necessary, may contain other additives and resins in a range that does not impair the object of the present invention. A proportion of a polycarbonate-based resin in the polycarbonate-based resin composition is, based on the weight of the resin composition, preferably 50 weight % or more, more preferably 70 weight % or more, and even more preferably 90 weight % or more.

When resins other than the polycarbonate-based resin are used together in the polycarbonate-based resin composition of the present invention, preferable from the viewpoint of the effect of the present invention are resins having good compatibility with the polycarbonate-based resin but, for example, an acrylic resin, which has excellent transmittance, may be used.

Further, as other additives to be added to the polycarbonate-based resin composition in the present invention, there may be preferably mentioned a stabilizer and a weathering agent.

A viscosity-average molecular weight of the polycarbonate resin is preferably 14,000 to 100,000, more preferably 20,000 to 30,000, even more preferably 22,000 to 28,000, and most preferably 23,000 to 26,000. When the molecular weight is too low falling below the above range, mechanical properties such as impact value and the like become insufficient and cracks tend to occur. In addition, when the molecular weight is high exceeding the above range, injection molding becomes difficult and crack defects tend to occur due to residual stress and the like. Further, in a more preferable range, both impact resistance and moldability are satisfied excellently. In addition, the polycarbonate resin may be one obtained by mixing resins whose viscosity-average molecular weights are outside the above range.

The viscosity-average molecular weight (MV) of the polycarbonate resin was obtained by substituting a specific viscosity ($\eta_{sp}$) into the following formula, the specific viscosity ($\eta_{sp}$) being determined at 20° C. using a solution of 0.7 g of the polycarbonate resin in 100 ml of methylene chloride:

$$\eta_{sp}/c=[\eta]+0.45[\eta]^2_c \text{ (where } [\eta] \text{ is an intrinsic viscosity)}$$

$$[\eta]=1.23\times10^{-4}MV^{0.83}$$

$$C=0.7$$

The composite tungsten oxide particles of the present invention are preferably those represented by MxWyOz (where M is an element selected from H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I; x, y and z are numbers satisfying the following formula:

$$0.01 \leq x \leq 1, 0.001 \leq x/y \leq 1, \text{ and } 2.2 \leq z/y \leq 3.0).$$

Among these, M is preferably an element selected from the group consisting of Li, Na, K, Rb, Cs, Mg, Ca, Sr, and Ba, and is most preferably K, Rb, or Cs. In addition, a range of x is preferably $0.01 \leq x \leq 0.5$ and more preferably $0.2 \leq x \leq 0.4$. Further, ranges of x/y and z/y are preferably respectively $0.01 \leq x/y \leq 0.5$ and $2.7 \leq z/y \leq 3.0$, and more preferably respectively $0.2 \leq x/y \leq 0.4$ and $2.8 \leq z/y \leq 3.0$.

The composite tungsten oxide particles can be obtained by subjecting a tungsten compound, a starting material, to a heat treatment in an inert gas atmosphere or a reducing gas atmosphere. The composite tungsten oxide particles obtained via the heat treatment have sufficient near-infrared ray shielding ability and have favorable properties as infrared ray shielding particles.

A particle diameter of the composite tungsten oxide particles is preferably 1 nm to 800 nm, more preferably 1 nm to 600 nm, and even more preferably 1 nm to 300 nm. When the particle diameter is smaller than 1 nm, an aggregation effect becomes large and dispersion defects tend to occur. When the particle diameter is larger than the upper limit, there may occur defects such as high haze of a transparent resin molded article.

A method for dispersing the composite tungsten oxide particles in a polycarbonate resin includes: a method of directly adding the composite tungsten oxide particles or composite tungsten oxide particles having the surface coated; and a method of first preparing a master obtained by diluting the composite tungsten oxide particles with the amount of polycarbonate resin that is 1 to 100 times as much as the composite tungsten oxide particles, and thereafter adding the master to the polycarbonate resin.

When compounding a polycarbonate-based resin and the composite tungsten oxide particles, there may be added a heat stabilizer, a weathering agent, and the like.

The light-transmissive member of the present invention preferably has average light transmittance of 70% or more in a wavelength range of 380 to 780 nm and average light transmittance of 50% or less in a wavelength range of 700 nm to 2500 nm, and more preferably has average light transmittance of 75% or more in a wavelength range of 380 to 780 nm and average light transmittance of 30% or less in a wavelength range of 700 nm to 2500 nm. When average light transmittance in a wavelength range of 380 to 780 nm is lower than 70%, deterioration of luminance is large, and when average light transmittance in a wavelength range of 700 nm to 2500 nm is more than 50%, the heat ray shielding effect is small.

The light-transmissive member of the present invention may have a single-layer structure or a multi-layer structure. In the case of a multi-layer structure, at least one layer thereof should be formed of a polycarbonate resin composition. For example, there may be mentioned a structure in which a layer formed of a polycarbonate resin composition is laminated with a layer formed of an acrylic resin. Further, a coating may be applied to a portion or whole of one side or both sides of the light-transmissive member of the present invention. Pencil hardness of the light-transmissive member of the present invention is preferably B or higher so that, for example, the light-transmissive member is hardly scratched even when wiped for cleaning, and more preferably HB or higher. From such a viewpoint, there may preferably be mentioned a light-transmissive member provided with a hard coat layer formed by coating a hard coat agent. As the hard coat agent, there may be suitably used one that is publicly known per se.

Specific commercial hard coat agents include Beam Set 575 manufactured by Arakawa Chemical Industries Ltd., U15HA manufactured by Shin-Nakamura Chemical Co., Ltd., and the like.

In order to further prevent penetration of heat rays (infrared rays), the display device of the present invention may be provided with, in addition to the light-transmissive member of the present invention, a reflection portion in a light passage that extends from a display unit to windshield glass. On the reflection portion, there may be provided a cold mirror coated with an optical interference film that transmits infrared rays but reflects visible light, or there may be provided an infrared reflection plate in the light passage, which reflects infrared rays but transmits visible light. In addition, a polarizer may be arranged in the light passage in order to further prevent penetration of heat rays without impairing luminance of a display unit.

In the light-transmissive member of the present invention, the smaller the variations in retardation and direction of slow axis, the better. From the viewpoint of suppressing a variation in luminance, an in-plane retardation of the light-transmissive member of the present invention is preferably 100 nm or less, more preferably 75 nm or less, and even more preferably 50 nm or less. When a retardation is high, luminance tends to be affected unless the light-transmissive member is used considering the direction of slow axis thereof.

Incidentally, the present invention is characterized in that visibility by naked eyes is highly balanced, while shielding infrared rays by composite tungsten oxide particles.

In addition, by setting an in-plane retardation in a specific range, both visibility by naked eyes and visibility through polarized sunglasses can also be highly balanced. From such a viewpoint, a lower limit of the in-plane retardation of the light-transmissive member is preferably 20 nm, more preferably 35 nm, and even more preferably 60 nm. When the in-plane retardation is less than the lower limit, luminance through the polarized sunglasses is hard to obtain. On the other hand, when visibility by polarized sunglasses is considered, an upper limit of the in-plane retardation of the light-transmissive member is preferably 170 nm, more preferably 160 nm, even more preferably 140 nm, and especially preferably 100 nm. When the in-plane retardation surpasses the upper limit, luminance through the polarized sunglasses becomes high but, when the slow axis of the light-transmissive member changes slightly, luminance comes to change significantly.

EXAMPLES

Examples in the present embodiment will be shown in the following. The present invention is not limited in any way by these examples.

The present invention will be described more specifically with reference to examples.

Example 1

There were used L-1250 manufactured by Teijin Limited as a polycarbonate resin and YMDS-874 (concentration of composite tungsten oxide particles: about 23 weight %) manufactured by Sumitomo Metal Mining Co., Ltd. as an infrared ray shielding agent. The whole of the polycarbonate resin and the infrared ray shielding agent was mixed by a blender so that a blending amount of the composite tungsten oxide particles becomes the proportion described in Table 1 and Table 2, and was melt-kneaded. For melt kneading, there was used a vent-type twin-screw extruder, TEX30a (intermeshing, rotation in the same direction, and double thread screw) manufactured by The Japan Steel Works, Ltd., which was a type having one kneading zone in front of a vent hole. Extrusion conditions included a discharge amount of 20 kg/h, a screw rotational speed of 150 rpm, and a degree of vacuum at the vent of 3 kPa. In addition, an extrusion temperature was set at 280° C. from a first supply port to a dice portion. In addition, the above production of a resin composition was performed in an atmosphere where clean air, which was passed through a HEPA filter, was circulated and, during operations, sufficient care was taken so that there is no contamination by foreign matter.

(Preparation of Test Piece)

After drying pellets obtained in a hot air circulation type dryer at 110 to 120° C. for 6 hours, a test piece for evaluation, having a thickness of 0.4 mm, was prepared by using a film forming apparatus, "KZW15TW-30MG-NH, FPU15-240" manufactured by Technovel Corporation, under the conditions of an extrusion temperature of 280° C. and a cooling roll temperature of 148° C.

Examples 2 to 5 and Comparative Examples 1 and 2

Examples 2 to 5 and Comparative Examples 1 and 2 were conducted in the same manner as in Example 1 except that changes were made as shown in Table 1 and Table 2.

(Evaluation Items)

(1) Luminance

A 50 mm square piece was cut out from the test piece and, as shown in FIG. 2, a light source (1), a polarizer (5), the test piece (2), and a glass plate (3) were arranged. The test piece (2) was adjusted by rotating the same so that characters seen by reflection from the glass plate (3) can be seen most brightly. The characters seen by reflection from the glass plate were confirmed by visual observation. In addition, the characters may be confirmed by a luminance meter (BM-7, manufactured by Topcon Technohouse Corp.). Compared to a polarizer in Comparative Example 4, a test piece being brighter and having better visibility was evaluated as good, one being darker was evaluated as poor, and one being equivalent was evaluated as fair.

Further, the results obtained by conducting the above evaluation without a polarizer arranged between the glass plate and the luminance meter were denoted as "naked eye evaluation" and the results with the polarizer arranged were denoted as "polarized sunglass evaluation."

(2) Temperature Increase

A 50×100 mm piece was cut out from the test piece and the cut-out test piece was arranged, outdoor on sunny day, about 50 mm above a temperature sensing part of a bar thermometer so as to shield sunlight. In addition, in order to prevent transfer of heat from a main body of the bar thermometer, care was taken so that a portion of the bar thermometer, which is not shielded by the test piece, is out of the sun. Evaluation was conducted with Example 3 as the standard, and a test piece with lower temperature than Example 3 was evaluated as good, one with higher temperature was evaluated as poor, and one with equivalent temperature was evaluated as fair.

(3) Average Transmittance (380 to 780 nm)

Average transmittance was measured in accordance with JIS K7361 by using SH-7000 manufactured by Nippon Denshoku Ind. Co., Ltd.

(4) Average Transmittance (700 to 2500 nm)

Spectral light transmittance was measured by Cary 5000 manufactured by Varian Inc. at a wavelength pitch of 5 nm and a scan rate of 600 nm/min, and an average of values at wavelengths from 700 to 2500 nm was obtained by calculation.

(5) In-Plane Retardation

An in-plane retardation of a test piece was measured by using KOBRA-21SDH manufactured by Oji Scientific Instruments Co., Ltd.

The above evaluations were conducted and the results of Examples 1 to 5 and Comparative Examples 1 and 2 are shown in Table 1 and Table 2.

TABLE 1

|  | Example 1 | Example 2 | Example 3 | Example 4 | Example 5 |
|---|---|---|---|---|---|
| A: Concentration of composite tungsten oxide particles (%) | 0.14 | 0.14 | 0.14 | 0.18 | 0.07 |
| B: Thickness (mm) | 0.4 | 0.6 | 0.2 | 0.4 | 0.4 |
| A (%) × B (mm) | 0.06 | 0.08 | 0.03 | 0.07 | 0.03 |
| Average transmittance (%) (380 to 780 nm) | 81 | 76 | 85 | 78 | 85 |
| Luminance | good | fair | good | good | good |
| Average transmittance (%) (700 to 2500 nm) | 23 | 13 | 44 | 16 | 44 |
| Temperature increase | good | good | fair | good | fair |

TABLE 2

|  | Comparative Example 1 | Comparative Example 2 |
|---|---|---|
| A: Concentration of composite tungsten oxide particles (%) | 0.09 | 0.09 |
| B: Thickness (mm) | 1.5 | 0.1 |
| A (%) × B (mm) | 0.14 | 0.01 |
| Average transmittance (%) (380 to 780 nm) | 67 | 88 |
| Luminance | poor | good |
| Average transmittance (%) (700 to 2500 nm) | 4 | 66 |
| Temperature increase | good | poor |

Comparative Example 3

A test piece that does not contain composite tungsten oxide particles was prepared by the same method as in Example 1 and evaluated by the same method as in Example 1.

Comparative Example 4

A polarizer used for a light-transmissive cover of an onboard head-up display was cut out from a real car and was evaluated by the same method as in Example 1. However, with regard to the average transmittance (380 to 780 nm), transmittance in the direction of the transmission axis was measured at a pitch of 5 nm by using VAP-7070 manufactured by JASCO Corporation, and an average value was obtained by calculation.

The above evaluations were conducted and evaluation results of Comparative Examples 3 and 4 are shown in Table 3

TABLE 3

|  | Comparative Example 3 | Comparative Example 4 |
|---|---|---|
| A: Concentration of composite tungsten oxide particles (%) | — | — |
| B: Thickness (mm) | 0.4 | 0.14 |
| A (%) × B (mm) | — | — |
| Average transmittance (%) (380 to 780 nm) | 90 | 76 (transmission axis) |
| Luminance | good | fair |
| Average transmittance (%) (700 to 2500 nm) | — | — |
| Temperature increase | poor | good |

Light-transmissive members obtained in Examples 1 to 5 have high light-transmissivity and high heat ray shielding performance against heat input from the sun into the display device. In contrast to these, in Comparative Example 1 where the thickness and the A×B are outside the scope of Claim, light-transmissivity is poor and, in Comparative Example 2 where the A×B is outside the scope of Claim, the temperature increase is high and heat ray shielding performance is poor.

Further, in Comparative Example 3 where composite tungsten oxide particles are not contained, the test piece shows high temperature increase and poor heat ray shielding performance. In Comparative Example 4 where there is used a polarizer which is being used for a commercial light-transmissive cover of an onboard head-up display, the polarizer has heat ray shielding performance but is poor in light-transmissivity.

Examples 6 to 9

A test piece was prepared by repeating the same operations as in Example 1 except that a touch roll was provided on the side of sheet not in contact with a cooling roll to adjust pressure so that an in-plane retardation shown in Table 4 was obtained.

The test piece obtained was evaluated with a configuration of FIG. 2, which was used for evaluation of luminance. The test piece (2) was adjusted by rotating the same so that characters seen by reflection from the glass plate (3) can be seen most brightly. A change in luminance, when the test piece (2) was rotated from that position to change the direction of slow axis by 360°, was confirmed by visual observation and, with Example 7 as the standard, a test piece with less change in luminance (naked eye) was evaluated as good and one with more change was evaluated as poor. In addition, as a guideline for visual observation, there may be used the aforementioned luminance meter.

Evaluation results of Examples 6 to 9 are shown in Table 4.

TABLE 4

|  | Example 6 | Example 7 | Example 8 | Example 9 |
|---|---|---|---|---|
| A: Concentration of composite tungsten oxide particles (%) | 0.14 | 0.14 | 0.14 | 0.14 |
| B: Thickness (mm) | 0.4 | 0.4 | 0.5 | 0.4 |
| A (%) × B (mm) | 0.06 | 0.06 | 0.07 | 0.06 |
| Average transmittance (%) (380 to 780 nm) | 50 | 100 | 200 | 20 |
| In-plane retardation (nm) | 81 | 81 | 78 | 81 |
| Luminance | good | good | fair | good |
| Average transmittance (%) (700 to 2500 nm) | 23 | 23 | 17 | 23 |
| Temperature increase | good | good | good | good |
| Influence on brightness when slow axis direction is changed (naked eye) | good | fair | poor | good |

Examples 10 to 15

A test piece was prepared by repeating the same operations as in Example 1 except that a touch roll was provided on the side of a sheet not in contact with a cooling roll, UV curable hard coat layers were provided on both surfaces of the sheet in a thickness of 5 µm, respectively, and an in-plane retardation was set at a value shown in Table 5.

The test piece obtained was evaluated with a configuration of FIG. 2, which was used for evaluation of luminance. The test piece (2) was adjusted by rotating the same so that characters seen by reflection from the glass plate (3) can be seen most brightly. A change in luminance, when the test piece (2) was rotated from that position to change the direction of slow axis by 360°, was confirmed by visual observation and, with Example 7 as the standard, a test piece with less change in luminance (naked eye) was evaluated as good and one with more change was evaluated as poor. In addition, as a guideline for visual observation, there may be used the aforementioned luminance meter.

In addition, with Example 11 as the standard, a test piece with less change in luminance (polarized sunglass) was evaluated as good and one with more change was evaluated as poor.

Evaluation results of Examples 10 to 15 are shown in Table 5.

TABLE 5

|  | Ex. 10 | Ex. 11 | Ex. 12 | Ex. 13 | Ex. 14 | Ex. 15 |
|---|---|---|---|---|---|---|
| A: Concentration of composite tungsten oxide particles (%) | 0.14 | 0.14 | 0.14 | 0.14 | 0.14 | 0.14 |
| B: Thickness (mm) | 0.4 | 0.4 | 0.4 | 0.4 | 0.4 | 0.4 |
| A (%) × B (mm) | 0.06 | 0.06 | 0.06 | 0.06 | 0.06 | 0.06 |
| Average transmittance (%) (380 to 780 nm) | 2 | 26 | 65 | 88 | 160 | 176 |
| In-plane retardation (nm) | 82 | 82 | 82 | 82 | 82 | 82 |
| Luminance | good | good | good | good | good | good |
| Average transmittance (%) (700 to 2500 nm) | 23 | 23 | 23 | 23 | 23 | 23 |
| Temperature increase | good | good | good | good | good | good |
| Influence on brightness when slow axis direction is changed (naked eye) | good | good | good | good | fair | poor |
| Influence of luminance change according to rotation angle (polarized sunglasses) | poor | fair | good | good | good | good |

(Ex.: Example)

INDUSTRIAL APPLICABILITY

The light-transmissive member of the present invention has high light-transmissivity for light from a head-up display device to front glass and high heat ray shielding performance against heat input from the sun into the display device that are equivalent to those of a polarizer. Therefore, the light-transmissive member of the present invention can be used for a head-up display and is useful.

REFERENCE SIGNS LIST (1) Display unit (light source having transparent colored characters written on its upper surface)
(2) Light-transmissive member (test piece)
(3) Projection surface (glass plate (with its angle adjusted so that the characters are easy to see for an observer))
(4) Housing
(5) Polarizer (absorption axis direction: illustrated)

The invention claimed is:

1. A light-transmissive member for use in a head-up display device, the light-transmissive member formed of a polycarbonate resin composition containing composite tungsten oxide particles as an infrared ray shielding agent in a polycarbonate-based resin obtained by reacting a dihydric phenol and a carbonate precursor, wherein the light-transmissive member has a thickness in a range of 0.2 to 0.6 mm and contains composite tungsten oxide particles as an infrared ray shielding agent;

wherein the content of the composite tungsten oxide particles, A (weight %), and a thickness of a layer containing the composite tungsten oxide particles, B (mm), satisfy the following formula:

$$0.02 \leq A \times B \leq 0.12 \tag{1};$$

wherein an in-plane retardation is 75 nm or less;

wherein an average light transmittance in a wavelength range of 380 to 780 nm is 70% or more, and an average light transmittance in a wavelength range of 700 nm to 2500 nm is 50% or less;

wherein the light-transmissive member is a light-transmissive cover of a head-up display device; and wherein the light-transmissive member has a single-layer structure.

2. The light-transmissive member according to claim 1, wherein the composite tungsten oxide particles are those represented by a general formula of $M_xW_yO_z$, wherein M is one or more element(s) selected from the group consisting of H, He, alkali metals, alkaline earth metals, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I;

wherein W is tungsten;

wherein O is oxygen;

wherein $0.1 \leq x \leq 0.5$;

wherein $0.5 \leq y \leq 1.5$; and wherein $2.0 \leq z \leq 3.5$.

3. The light-transmissive member according to claim 1, further provided with a polarization function.

4. A head-up display device comprising:
the light-transmissive member according to claim 1; and
a display unit which outputs images outside through the light-transmissive member.

* * * * *